(12) United States Patent
Legois

(10) Patent No.: US 10,495,436 B2
(45) Date of Patent: Dec. 3, 2019

(54) CENTERLINE AND ANGLE FINDER LAYOUT TOOL FOR CYLINDRICAL AND RADIAL SURFACES

(71) Applicant: Richard J. Legois, Burlington, WI (US)

(72) Inventor: Richard J. Legois, Burlington, WI (US)

( * ) Notice: Subject to any disclaimer, the term of this patent is extended or adjusted under 35 U.S.C. 154(b) by 119 days.

(21) Appl. No.: 15/922,206

(22) Filed: Mar. 15, 2018

(65) Prior Publication Data

US 2018/0306566 A1      Oct. 25, 2018

Related U.S. Application Data

(60) Provisional application No. 62/472,677, filed on Mar. 17, 2017.

(51) Int. Cl.
| | |
|---|---|
| *G01B 5/24* | (2006.01) |
| *G01B 5/00* | (2006.01) |
| *G01B 3/56* | (2006.01) |
| *B25B 29/00* | (2006.01) |

(52) U.S. Cl.
CPC ............ *G01B 5/24* (2013.01); *G01B 3/563* (2013.01); *G01B 5/0002* (2013.01); *B25B 29/00* (2013.01)

(58) Field of Classification Search
CPC ........ G01B 3/56; G01B 3/563; G01B 5/0002; G01B 5/24
USPC ......................................................... 33/520
See application file for complete search history.

(56) References Cited

U.S. PATENT DOCUMENTS

| | | | | |
|---|---|---|---|---|
| 1,368,224 A | * | 2/1921 | Meitner | G01C 3/10 33/267 |
| 2,516,187 A | * | 7/1950 | Deimel | G06G 3/08 33/284 |
| 2,621,420 A | * | 12/1952 | Brelsford | B25D 5/02 33/632 |
| 2,822,623 A | | 2/1953 | Legois | |
| 4,651,438 A | * | 3/1987 | Hutter | G01B 5/201 33/550 |
| 5,074,051 A | * | 12/1991 | Cordy | G01B 5/14 33/520 |
| 6,067,721 A | * | 5/2000 | Dall'Aglio | B24B 49/04 33/555.1 |
| 6,411,375 B1 | * | 6/2002 | Hinkle | G01B 11/272 33/286 |

(Continued)

*Primary Examiner* — Yaritza Guadalupe-McCall
(74) *Attorney, Agent, or Firm* — Joseph S. Heino; Erin E. Kaprelian

(57) ABSTRACT

A hand layout tool, apparatus, and method directed toward skilled and industrial trades, or for use within other similar mechanical layout and user applications, is presented. The current invention allows the trades technician or user to quickly and accurately determine or otherwise identify the outer or inner centerline of a radial or cylindrical surface feature at a selected or desired angle. Alternately, the current invention can allow the user to quickly, easily, and accurately measure or otherwise determine the included angle between two imaginary planes: a first plane defined as being coincident with the central axis of the cylindrical or radial surface and a first point on an outer or inner cylindrical or radial surface and a second plane defined as being coincident with the central axis of the cylindrical or radial surface and a second point on an outer or inner cylindrical or radial surface.

19 Claims, 8 Drawing Sheets

(56) References Cited

U.S. PATENT DOCUMENTS

| | | | | |
|---|---|---|---|---|
| 6,568,096 B1* | 5/2003 | Svitkin | ............... | B23Q 1/76 |
| | | | | 33/501.02 |
| 7,581,330 B1* | 9/2009 | Redmond | ............... | G01B 3/26 |
| | | | | 33/542 |
| 2010/0251558 A1* | 10/2010 | Franzen | ............... | G01B 5/201 |
| | | | | 33/550 |
| 2018/0306566 A1* | 10/2018 | Legois | ............... | G01B 3/56 |

* cited by examiner

CENTERLINE AND ANGLE FINDER LAYOUT TOOL FOR CYLINDRICAL AND RADIAL SURFACES

PRIORITY CLAIM

This application claims priority to U.S. Provisional Patent App. No. 62/472,677, filed on Mar. 17, 2017, the contents of which are herein incorporated by reference.

FIELD OF THE INVENTION

The current invention is generally directed to an improved type of portable geometrical instrument for angular measurements. In particular, it is a hand tool or instrument apparatus and method for the purpose of producing, for example, accurately-placed indication marks, reference points, center-punch marks, and drilled holes or pilot holes as may be preferred, into or upon generally cylindrical surfaces at predetermined orientations or desired angels with respect to an imaginary, generally vertical or horizontal reference plane, as defined by a central axis and the directional force of gravity. Practical applications for this invention are directed toward various cylindrical or radial surfaces in a variety of applications. Such surfaces may include, for example, metal or plastic plumbing and piping, structural and mechanical round tubing, round tubular electrical conduit, circular ductwork, machinist operations, round woodwork, or otherwise practically any rounded object including a surface defined as having a generally constant radius from a single imaginary reference line or central axis. Preferably and ideally, a point coincident with an imaginary central axis at the outer cylindrical or radial surface will be permanently marked, and will at least be temporarily indicated when the geometrical instrument is properly used. It is preferable that the central line of the axis of the cylinder or radial surface is as close to horizontal as possible when angle reference measurements or reference points are being taken or established. However, this preference is not critical to the intent and effective use of the invention. This inherent aspect of the current invention is of significance due to the fact that the force of gravity itself is employed as a primary reference for the geometrical instrument's measurements and indicating capabilities. The accuracy of the improved angular measurement tool or geometrical instrument apparatus tends to significantly and progressively improve as its own ideal vertical axis of operation becomes more closely aligned with the true vertical force of gravity.

The essential and primary scope and purpose of the current invention represents a simple and improved hand layout tool, apparatus, and method directed toward skilled and industrial trades, or for use within other similar mechanical layout and user applications. The current invention allows the trades technician or user to quickly and accurately determine or otherwise identify the outer or inner centerline of a radial or cylindrical surface feature at a selected or desired angle. Alternately, the current invention can allow the user to quickly, easily, and accurately measure or otherwise determine the included angle between two imaginary planes, with a first plane defined as being coincident with the central axis of the cylindrical or radial surface and a first out on an outer or inner cylindrical or radial surface, and a second plane defined as being coincident with the central axis of the cylindrical or radial surface and a second pout on an outer or inner cylindrical or radial surface. For example, the included angel or difference between these two imaginary plane-angle measurements may be the desired resulting angle of interest to the user or technician. Additionally, the ease and speed at which the invention may be adjusted to either interior or external cylindrical or radial surfaces as desired, and the speed at which relative angle measurements may be applied and otherwise indicated with respect to inner or outer cylindrical or radial surfaces represents at least one of the key and primary advantages of the current invention.

BACKGROUND OF THE INVENTION

The application and use of the current invention generally relates to skilled trades, machinists, plumbing and piping, woodworking, general industry, and user in particular specific applications where it becomes necessary to accurately measure, layout, locate, and other indicate, mark, center-punch, or drill a point at the center of an inner or outer cylindrical shape at a desired angle for any number or variety of reasons. Apart from the current invention, the exact ways and means to accomplish the desired results may vary widely and depend entirely upon the particular common tools that may be readily available, as well as the particular skill, experience, and ingenuity of the particular user or work group, as well as the levels of experience, knowledge, know-how, and established types of processes involved.

Conventional hand measurement tools may be typically employed for such tasks and used in various ways or combinations, ultimately producing an uncertain range of difficulty and potential outcomes leading to various degrees of failure or success through inconsistent means and methods. Conventional hand tools, for example, may include, but not be limited to: marking pencils and pens, flexible measuring tapes, protractors, spirit levels, straight-edges, rulers, squares, string and chalk-lines, plumb-bobs, dividing compasses, scribes, punches, hammers, drills, various types of paper, cardboard, and adhesive tapes. As already state, the various ways and means that such common tools, materials, and know-how can be incorporated and employed can vary dramatically, producing equally mixed expectations and results. It is the object of this invention to provide a solution to this problem by providing a unique and specialized, yet versatile, hand tool and measurement apparatus that simplifies the processes of determining or laying out a particular point or position at a specific angle on a cylindrical or radial surface. Further, it is the object of this invention to provide an accurate, concise, simplified, and consistent means and method for determining, defining, and measuring a specific point or position at a specific angle on a cylindrical or radial surface of interest. The current invention provides a significant level of simplicity, advantages, and benefits beyond that of existing tools and methods currently known to the various skilled trades and industries.

SUMMARY OF THE INVENTION

The current geometrical instrument, apparatus, and method offers to provide a number of improvements, advantages, and benefits over that of existing methods and known processes involving a variety, and combinations of, common measurement instruments and hand tools.

DETAILED DESCRIPTION

The purpose and function of the current geometrical instrument tool invention and apparatus and method is to produce indication marks, punch marks, or drilled holes and pilot holes at a desired angle upon or through a cylindrical or radial surface.

Figure 1A:
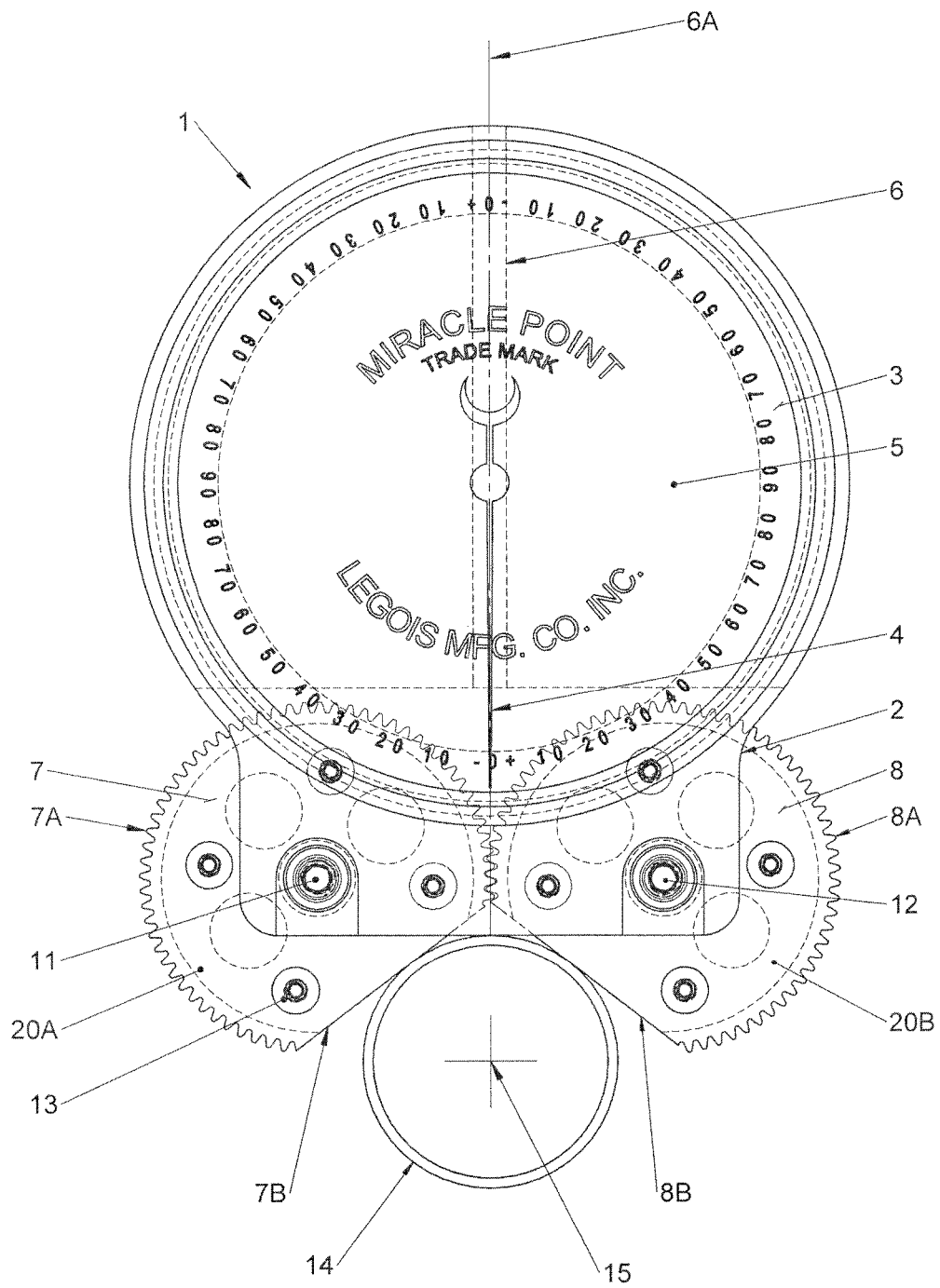
FIG. 1A illustrates a front or plan view of the current invention, including hidden lines, where the improved geometrical instrument or center-finder measurement tool is engaged for generally two-point contact at the outer surface of a cylindrical object at the respective flat surfaces of two rotatably operated and intermeshed gear wheels, and where the instrument is being held (operator's hands not shown) at a desired vertical position, as indicated by the needle on the dial of the instrument indicating zero degrees with respect to the vertical in the downward direction.
Figure 1B:
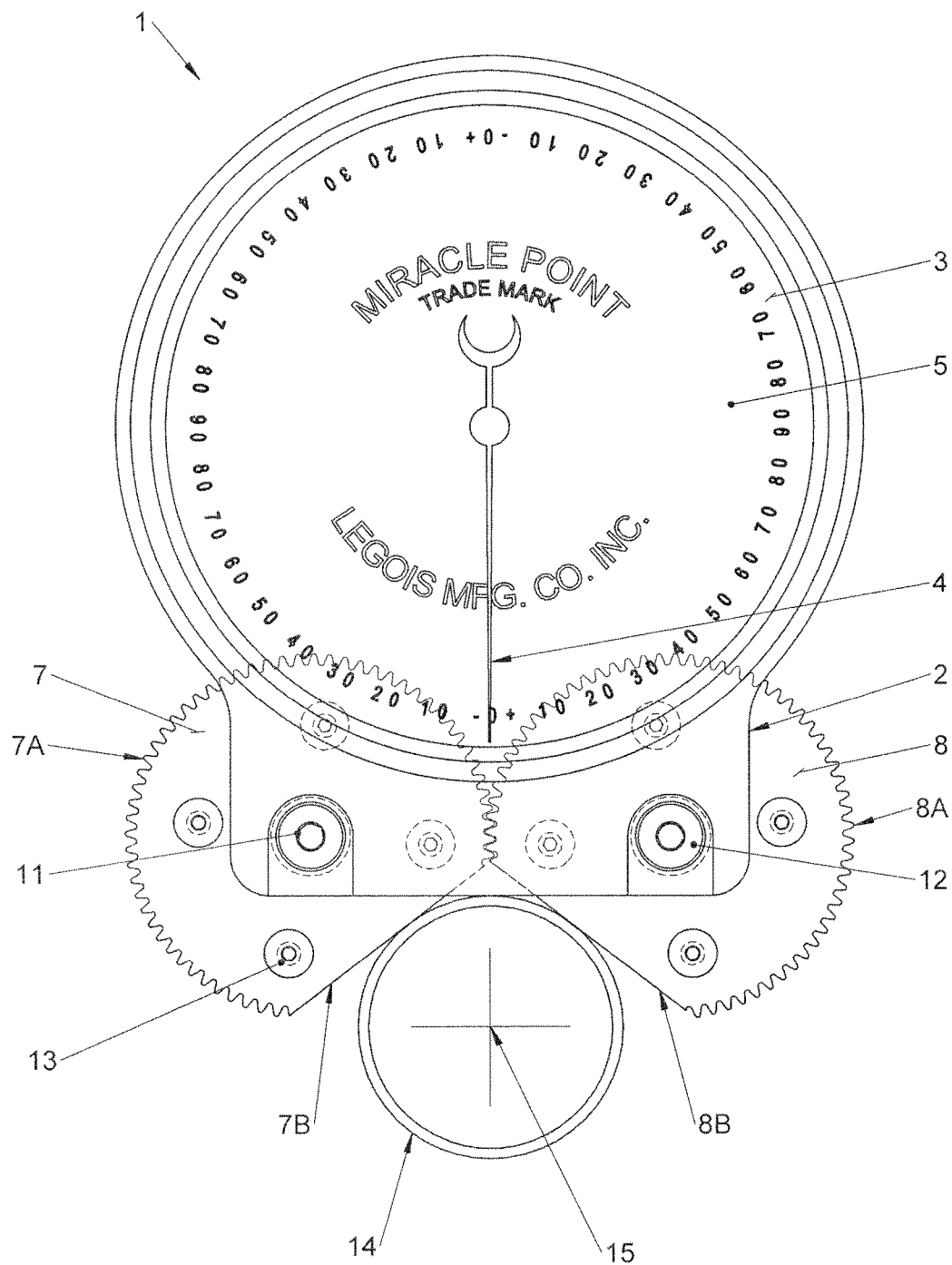
FIG. 1B illustrates a front or plan view of the current invention, including fewer hidden lines, where the improved geometrical instrument or center-finder measurement tool is engaged for generally two-point contact at the outer surface of a cylindrical object at the respective flat surfaces of two rotatably operated and intermeshed gear wheels, and where the instrument is being held (operator's hands not shown) at a desired vertical position, as indicated by the needle on the dial of the instrument indicating zero degrees with respect to the vertical in the downward direction.

As shown in FIGS. 1A and 1B, the current geometrical instrument tool 1 is comprised of a structural frame plate 2, which provides primary structural support and mechanical location for the remaining associated components of the device. A mechanical dial indicating protractor 3 (currently available from Cullen-Legois Manufacturing, Inc., 2850 Wisconsin Street, Sturtevant, Wis. 53177) is securely mounted and affixed to structural frame plate 2. While the essential function of the mechanical dial indicating protractor 3 is to determine precise angels with respect to gravity, the internal construction, operation, and mechanics of the mechanical dial indicating protractor 3 itself may be generally disclosed in greater detail through published manufacturer information and through U.S. Pat. No. 2,822,623 to R. J. Legois, titled Marking Gauge Having Means for Securing Said Gauge to Workpieces, issued Feb. 11, 1958, the contents of which are hereby incorporated by reference. As such, the dial indicating protractor 3 will not be described in greater detail within this disclosure.

The items of particular interest for this particular component are the indicating needle 4 and the graduated face of the dial 5, calibrated to 360 degrees and marked in quadrants of 0 to 90 degree graduations, respectively, at its outer periphery. Additionally, a center position indicating through-hole 6 (shown in FIG. 1A) is disposed through the body of the indicating protractor 3, and is oriented and calibrated for precise alignment coincident with respect to an imaginary central axis 15 of a cylindrical object 14 and with respect to the remaining geometry and dimensional characteristics of the tool 1. At the lower portion of the structural frame plate 2 are opposing left sets 7,9, and right sets 8,10, of gear-wheels, respectively, which are pivotably attached to the structural frame plate 2 for rotation about an axis of generally free rotation at pivot bolts 11, 12, respectively. See also FIGS. 2A through 2C.

Gear teeth 7A of left gear-wheel 7 and gear teeth 8A of right gear-wheel 8 are intermeshed for engagement such that the respective flat contact portions 7B, 8B of each respective gear-wheel are able to rotate in precisely equal but opposite directions at the same time. The purpose of this is to allow the flat contact portions 7B, 8B to be ideally adjusted with respect to a variety of either external or internal cylindrical or round radial surfaces of various diameters and radii. When in firm contact with a cylindrical object 14 (a tube or pipe in this example) at flat contact portions 7B, 8B, the orientation provided to the overall geometrical instrument 1 is such that the centerline axis 6A of the center position indicating through-hole 6 is in close and approximately precise practical alignment with the centerline axis 15 of the cylindrical object 14.

It should be noted that the advantage and purpose of having two pairs of gear wheels, the left side set 7,9 securely fastened together by four bolts 13, and the right side set 8, 10 securely fastened together by another set of four bolts 13 engaged through slightly over-sized holes within the aforementioned gear wheels is that it provides a means of slight index adjustment between the respective gear set pairs. The purpose of this is to reduce or otherwise eliminate gear tooth backlash between the respective left and right gear sets as much as practical or possible. This design feature accounts for, and significantly reduces, slack or backlash between the teeth of the gear wheel sets that might otherwise exist if only two (one right and one left) gear wheels were utilized as the primary bisecting angle mechanism of the improved geometrical instrument and invention.

Figure 2A:
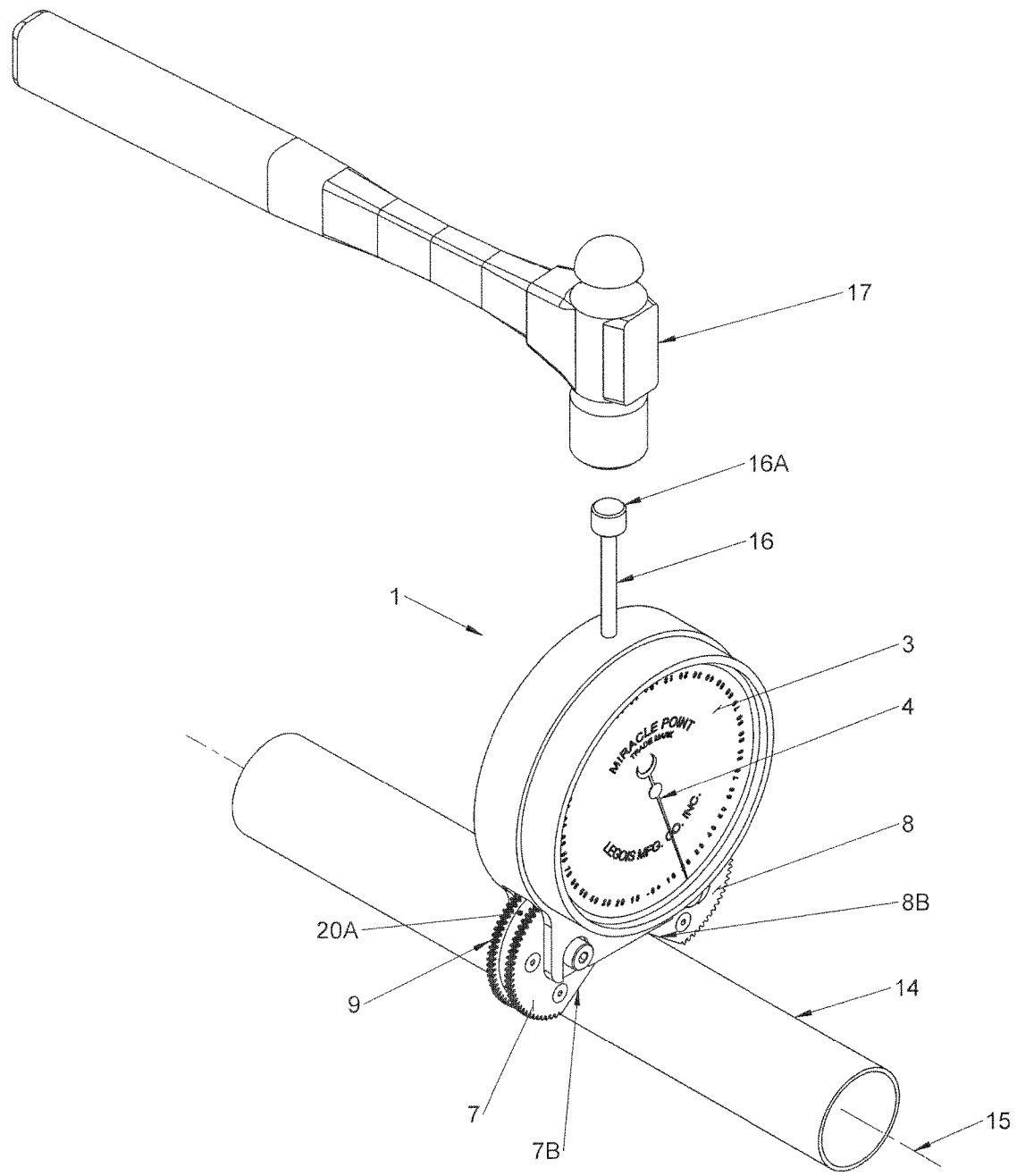
FIGS. 2A and 2B illustrate perspective views of a first embodiment of the current invention where the center-finder invention apparatus is engaged with a round object (e.g., a metal pipe or tube), for example, and where the center axis of the tube is generally horizontal. As shown previously in FIG. 1, the respective and opposing flat faces of the two rotatably intermeshed gear wheels are held in firma and simultaneous contact (operator's hands not shown) with the surface of the cylindrical object. A pointed and hardened steel punch slidably engaged through a close-fitting central hole through the body of the instrument can then be struck at the uppermost head end with a hammer, thus providing a small indentation or indication mark on the surface of the cylindrical object or tube at the desired angle as indicated by the needle and marked graduations on the face of the dial of the instrument.
Figure 2B:
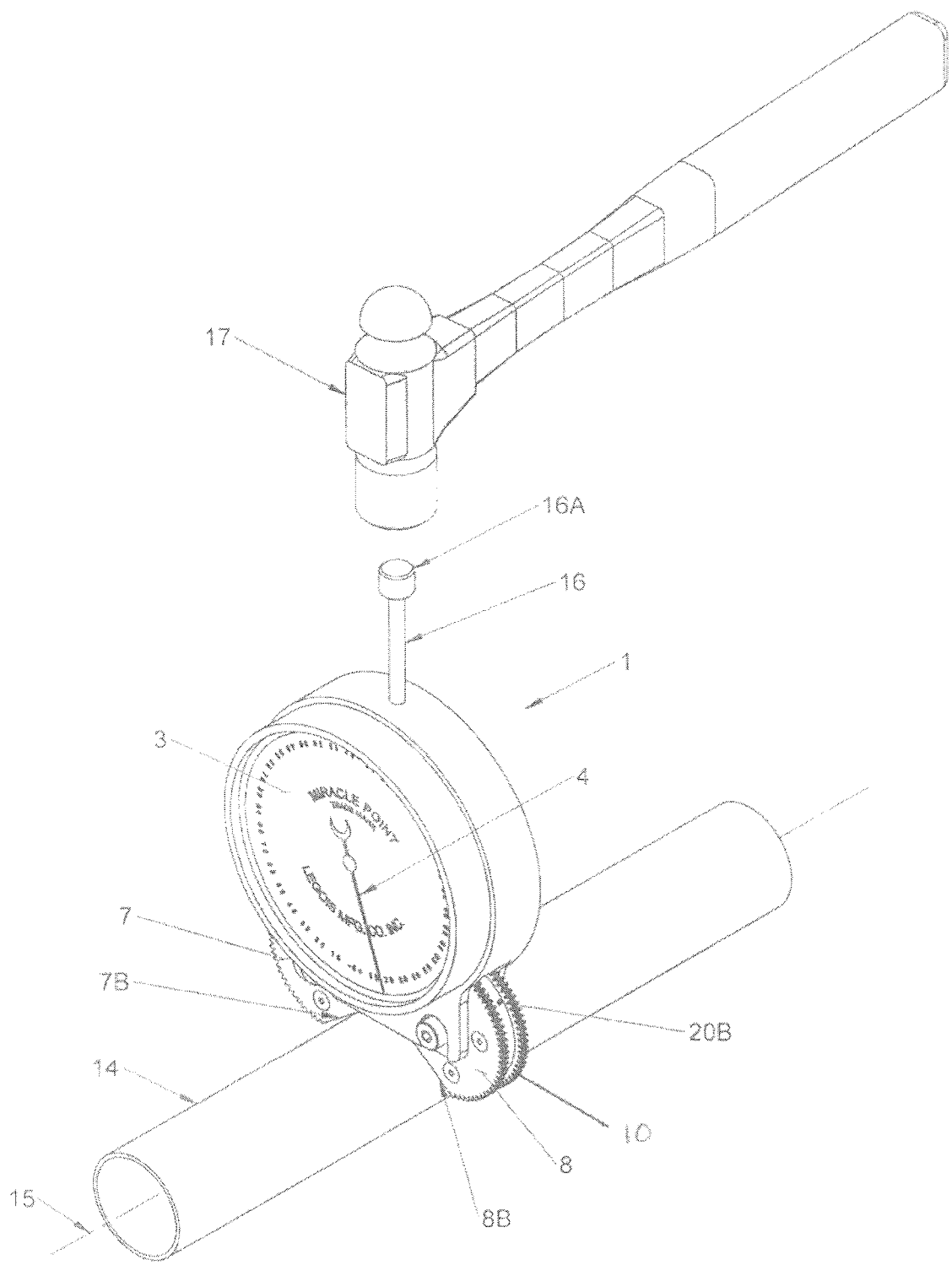
Figure 2C:
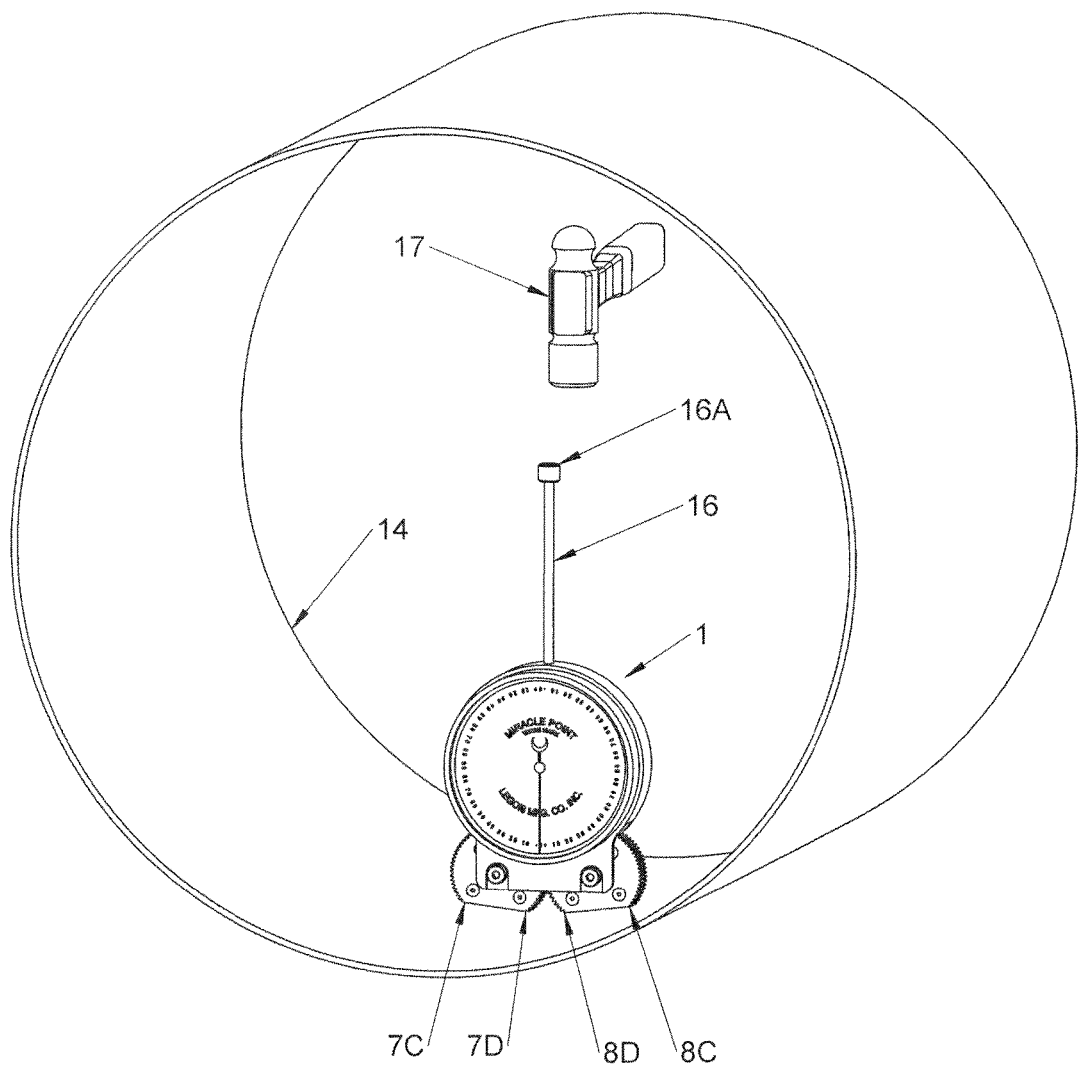
FIG. 2C illustrates a perspective view of a first embodiment of the current invention where the center-finder invention is engaged with a round object (e.g., a metal pipe or tube) at an interior surface of the round object. A pointed and hardened steel punch is slidably engaged through a central hole through the body of the instrument.

Once the desired points of contact with a cylindrical surface are met and the desired orientation angle of the apparatus is achieved, a pointed, hardened steel punch 16 is slidably engaged through the center position indicating through-hole 6 through the body of the instrument 1, as shown in FIGS. 2A, 2B, and 2C. The punch 16 can then be struck at the uppermost head end 16A with a hammer 17, thus providing a small indentation or indication mark (not currently shown) on the surface at the center of the cylindrical object or tube 14. The result is that the small indentation or indication mark will be produced at the center of the surface of the cylindrical object or tube 14 at the desired angel from vertical (or horizontal), as indicated during this operation by the needle 4 and the marked graduations on the face of the dial 3 of the instrument 1.

Figure 3A:
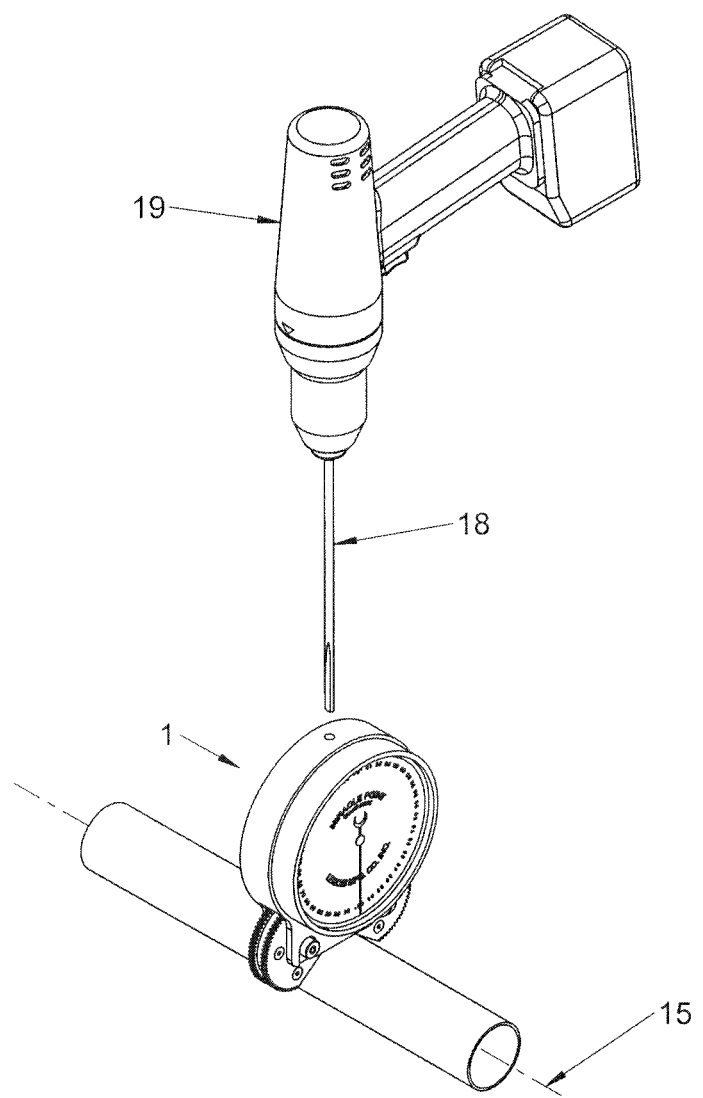
FIGS. 3A and 3B illustrates perspective views of a second embodiment of the current invention, where the center-finder invention apparatus is engaged with a round object (e.g. a metal tube or pipe), for example, and where the center axis of the tube is generally horizontal. As shown previously in FIGS. 1 and 2, the respective and opposing flat faces of the two rotatably intermeshed gear wheels are held in firm and simultaneous contact (operator's hands not shown) with the surface of the cylindrical object. In this second embodiment, a long and close-fitting metal twist drill is inserted for free rotating contact through the body of the instrument. In this example, a cordless electric drill is used to spin and drive the metal twist drill into the surface and/or through the cylindrical object, as desired. The precise angle of the hole to be produced is provided by means of holding the instrument apparatus at the desired angle, as indicated by the needle and marked graduations on the face of the dial of the instrument.
Figure 3B:
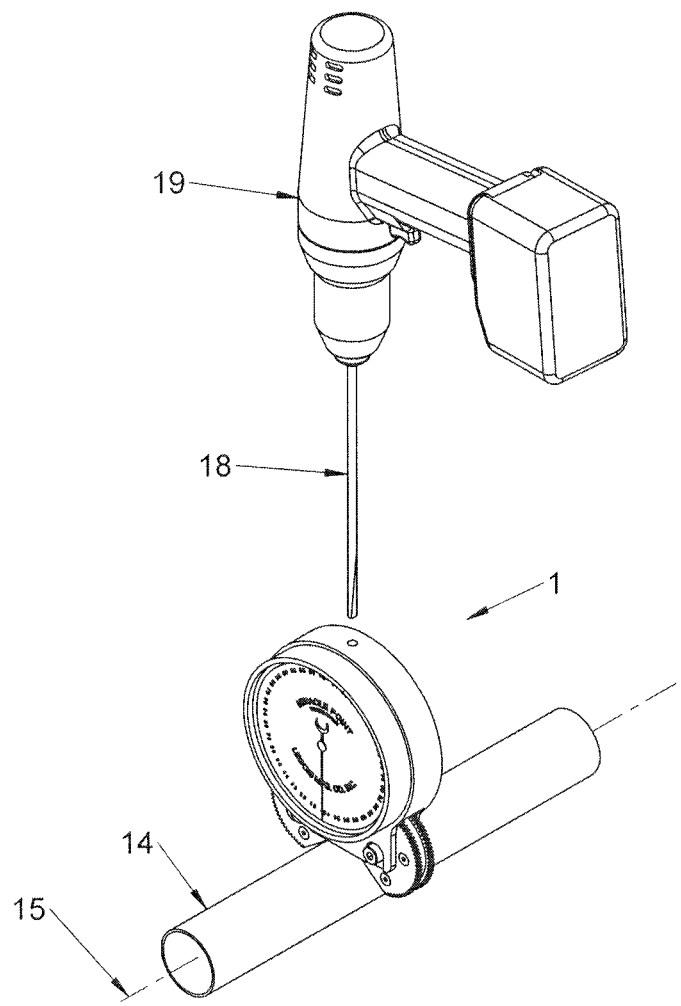
Figure 3C:
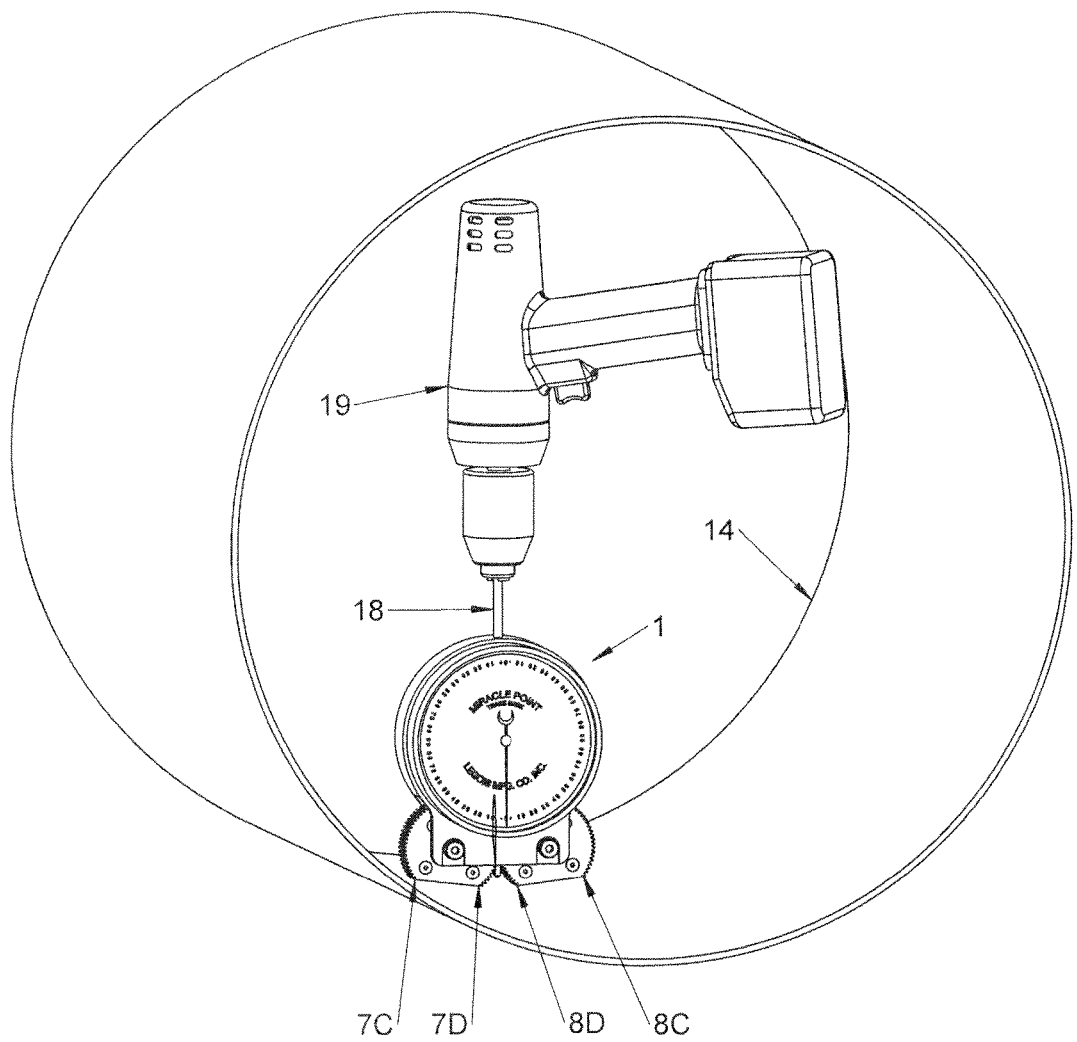
FIG. 3C illustrates a perspective view of a second embodiment of the current invention where the center-finder invention is engaged with a round object (e.g., a metal pipe or tube) at an interior surface of the round object. A long and close-fitting metal twist drill is inserted for free rotating contact through the body of the instrument.

Using the procedure previously described above for FIGS. 2A through 2C using a pointed, hardened steel punch, a second embodiment of the invention provides for the use of a steel twist drill 18 and a cordless electric drill 19, as shown in FIGS. 3A, 3B, and 3C. In this second embodiment of the invention, a small through hole or pilot hole (not currently shown) having the same basic diameter of the body of the hardened steel punch 16 may be drilled into and/or through the center of the cylindrical object or tube 14 at the desired orientation or angle from vertical (or horizontal), as indicated by the needle 4 and the marked graduations on the face of the dial 3 of the instrument 1.

In a third embodiment of the invention, wet paint may be applied to the pointed tip of the pointed, hardened steel punch 16 prior to insertion into the center position indicating through-hole 6 of the body apparatus instrument 1. Alternately, any similar marking too, for example, a Sharpie® permanent ink marker, having a correct close fitting diameter may be employed to indicate and mark the center of the cylindrical object or tube 14 without mechanically disrupting the surface of the cylindrical feature for later reference, as may be desired.

The invention claimed is:

1. A device, comprising:
    a frame plate;
    a mechanical dial indicating protractor coupled to the frame plate;
    an indicating needle;
    a first pair of gear wheels coupled to the frame plate, wherein the first pair of gear wheels comprises:
        a first left gear wheel; and
        a first right gear wheel; and
    a second pair of gear wheels coupled to the frame plate such that the second pair of gear wheels are parallel to the first pair of gear wheels, wherein the second pair of gear wheels comprises:
        a second left gear wheel; and
        a second right gear wheel.

2. The device of claim 1, further comprising a center position indicating through-hole disposed through the body of the indicating protractor.

3. The device of claim 2, wherein the through-hole is oriented such that the through-hole is aligned with a central axis of a cylindrical object.

4. The device of claim 1, wherein the mechanical dial indicating protractor further comprises a graduated face calibrated to 360 degrees.

5. The device of claim 4, wherein the graduated face is calibrated to 360 degrees in four quadrants of ninety degrees.

6. The device of claim 1, wherein the indicator needle is rotatably coupled to the mechanical dial indicating protractor.

7. The device of claim 1, wherein:
    the first set of gear wheels is coupled to the frame plate such that the first set of gear wheels is pivotable with respect to the frame plate; and
    the second set of gear wheels is coupled to the frame plate such that the second set of gear wheels is pivotable with respect to the frame plate.

8. The device of claim 1, wherein:
    the first left gear wheel is coupled to the second left gear wheel by a first plurality of fasteners; and
    the first right gear wheel is coupled to the second right gear wheel by a second plurality of fasteners.

9. The device of claim 8, wherein:
    the first plurality of fasteners and the second plurality of fasteners are insertable into a corresponding plurality of holes in the first left gear wheel, the first right gear wheel, the second left gear wheel, and the second right gear wheel; and
    the plurality of holes have a diameter that is greater than the diameter of each of the first plurality of fasteners and the second plurality of fasteners.

10. The device of claim 1, wherein:
    the first left gear wheel includes a first substantially straight portion; and
    the first right gear wheel includes a second substantially straight portion such that the first substantially straight portion and the second substantially straight portion form an angle when the first left gear wheel is coupled to the first right gear wheel.

11. The device of claim 1, wherein:
    the second left gear wheel includes a first substantially straight portion; and
    the second right gear wheel includes a second substantially straight portion such that the first substantially straight portion and the second substantially straight portion form an angle when the second left gear wheel is coupled to the second right gear wheel.

12. The device of claim 1, wherein:
    the first left gear wheel includes a plurality of gear teeth;
    the first right gear wheel includes a plurality of gear teeth such that the first right gear wheel and the first left gear wheel engage when the gear teeth of the first left gear wheel and the gear teeth of the first right gear wheel intermesh;
    the second left gear wheel includes a plurality of gear teeth; and
    the second right gear wheel includes a plurality of gear teeth such that the second right gear wheel and the second left gear wheel engage when the gear teeth of the second left gear wheel and the gear teeth of the second right gear wheel intermesh.

13. The device of claim 12, wherein:
    the first pair of gear wheels are rotatable in a first direction; and
    the second pair of gear wheels are rotatable in a second direction that is opposite the first direction.

14. The device of claim 1, further comprising:
    a first spacer plate located between the first left gear wheel and the second left gear wheel; and
    a second spacer plate located between the first right gear wheel and the second right gear wheel.

15. A method, comprising:
moving a first pair of gear wheels, wherein:
- the first pair of gear wheels comprises a first left gear wheel and a first right gear wheel coupled to a frame plate;
- the first left gear wheel has a first substantially straight portion;
- the first right gear wheel has a second substantially straight portion; and
- the first left gear wheel is engaged with the first right gear wheel at a plurality of gear teeth;

moving a second pair of gear wheels, wherein:
- the second pair of gear wheels comprises a second left gear wheel and a second right gear wheel coupled to the frame plate;
- the second left gear wheel has a first substantially straight portion;
- the second right gear wheel has a second substantially straight portion; and
- the second left gear wheel is engaged with the second right gear wheel at a plurality of gear teeth;

placing the first pair of gear wheels and the second pair of gear wheels onto a surface such that the first substantially straight portions and the second substantially straight portions contact the surface; and determining an angle, wherein:
- the angle is determined at a mechanical dial indicating protractor coupled to frame plate; and
- the angle is indicated by an indicated needle, wherein the indicating needle rotates as the first pair of gear wheels and the second pair of gear wheels moves.

16. The method of claim 15, further comprising engaging a punch, wherein engaging the punch comprises:
- sliding a punch through a through-hole of the frame plate to contact the surface; and
- striking the punch to produce an indicator on the surface.

17. The method of claim 16, wherein the through-hole is a center position indicator through-hole.

18. The method of claim 15, wherein moving a first pair of gear wheels comprises rotating the first left gear wheel and the first right gear wheel in opposing directions.

19. The method of claim 15, wherein moving a second pair of gear wheels comprises rotating the second left gear wheel and the second right gear wheel in opposing directions.

* * * * *